United States Patent [19]
Shaver

[11] 3,742,779
[45] July 3, 1973

[54] SEGMENTED GEARING

[75] Inventor: Marvin Bruce Shaver, Beaconsfield, Quebec, Canada

[73] Assignee: Dominion Engineering Works, Limited, Lachine, Quebec, Canada

[22] Filed: Sept. 3, 1971

[21] Appl. No.: 177,702

[30] Foreign Application Priority Data
Nov. 30, 1970 Canada .................................. 99391

[52] U.S. Cl. .................................................. 74/448
[51] Int. Cl. .............................................. F16h 55/12
[58] Field of Search ....................... 74/448, 450, 439

[56] References Cited
UNITED STATES PATENTS
| | | |
|---|---|---|
| 596,784 | 1/1898 | Mullin .................................. 74/448 |
| 752,898 | 2/1904 | Fogarty ................................ 74/448 |
| 1,312,818 | 8/1919 | Wright et al. ....................... 74/448 |
| 3,472,090 | 10/1969 | Dawe ................................ 74/448 X |

Primary Examiner—Leonard H. Gerin
Attorney—Raymond A. Eckersley et al.

[57] ABSTRACT

Interchangeable and replacement segment gear portions are provided for incorporation into a segmented composite gear wheel, to facilitate construction, erection and transportation of the gear and to enable rapid repair to the gear wheel upon the occurrence of damage to one or more segments of the gear. Replacement segment gear portions are dimensionally relieved at their securing faces to permit precise matching of the adjoining teeth in operative relationship. The repair of very large gears may be readily effected using such replacement segments.

1 Claim, 4 Drawing Figures

PATENTED JUL 3 1973
3,742,779
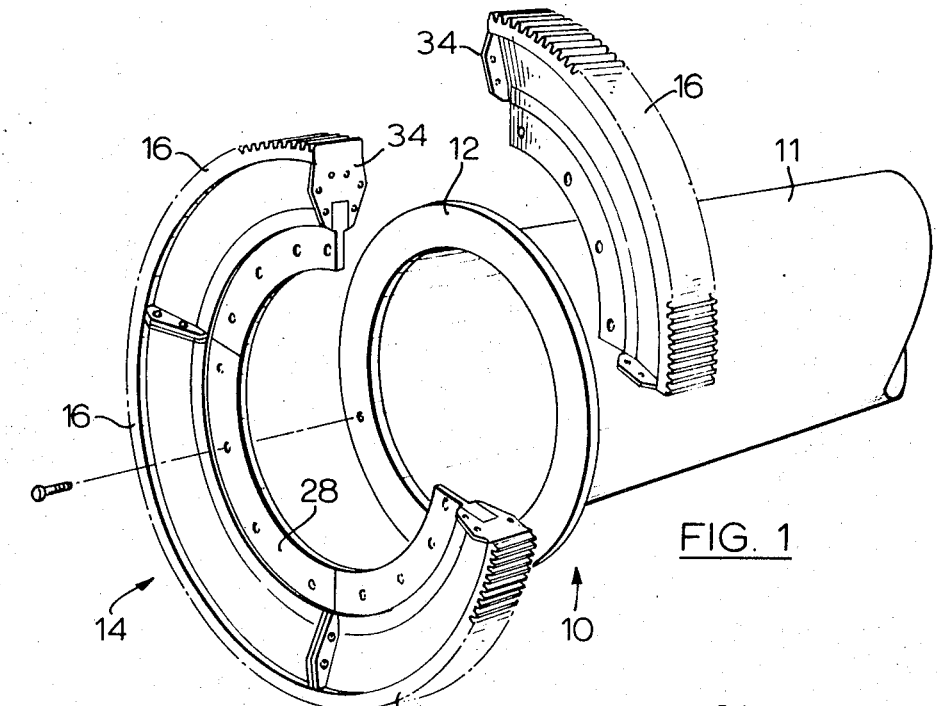
FIG. 1
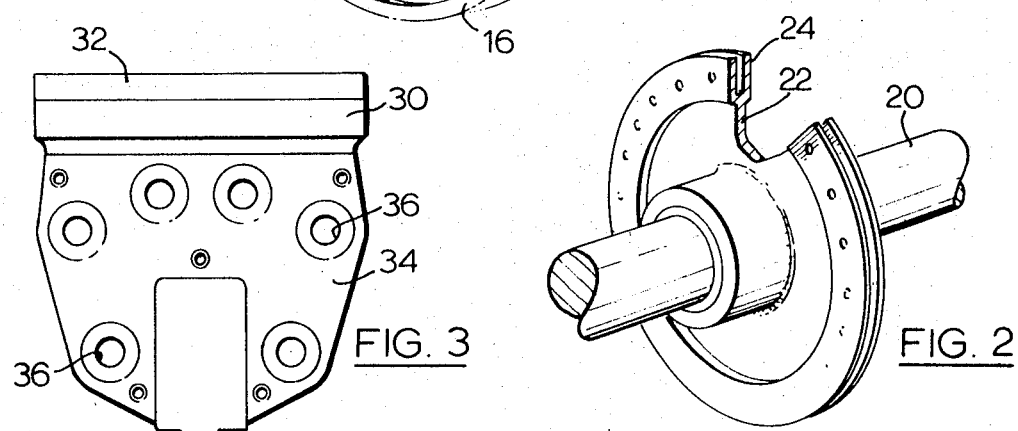
FIG. 3
FIG. 2
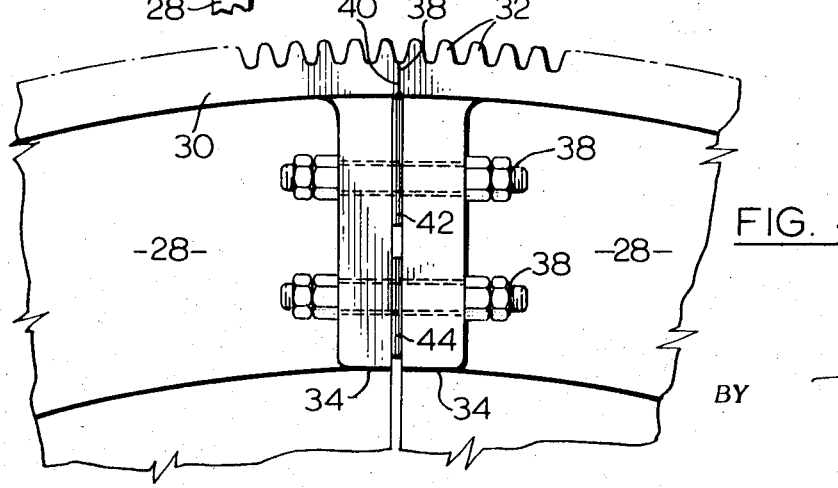
FIG. 4
INVENTOR.
BY  R Q Eckersley
Patent Agent

SEGMENTED GEARING

This invention is directed to interchangeable replacement gear segments for use in constructing or repairing large gear wheels of the segmented type.

In the transmission of power to high capacity machinery utilizing speed reducing gears between the prime mover and the machine, use has been made for many years of bull gear wheels having a number of like segments bolted together to form a substantially unitary annular rim, into which the teeth of the gear have been cut. As in the case of one-piece gears, the occurrence of extensive tooth damage or breakage has required replacement of the whole gear wheel, without any advantage being taken of the segmented nature of the wheel.

The use of gears of very large diameter, in the order of 30 feet and upward, is becoming more widespread. Owing to the use of electrical prime movers having enhanced starting torque characteristics, the dangers of gear tooth breakage have increased but the provision of replacement gears on the occurrence of such damage is very burdensome. The manufacturing lead times for such large gears are up to two years, and difficulties in transportation of gears to the site create severe problems in repairing such gear driven installations. The high capitalization cost of plants using large gears such as autogenous mills, that may be immobilized by extended non-productive downtime due to gear breakage make the economic advantages of the subject invention of considerable significance.

A further advantage of the present invention is the greater mobility afforded, thus facilitating installation in remote sites and reducing transportation complexity and costs.

The present invention provides interchangeable precut segment gears for assembly into gear wheels for repairing such wheels, to overcome the foregoing disadvantages. The segmenting of a bull gear by having the tooth form tied to the rim segments so that the segment joints occur at the tooth root portions, make it possible to precut a replacement segment for substitution in such a wheel. In practicing the invention, it is preferred to make the interchangeable segments undersized, in the structural sense, to permit fitting adjustment of the spacing of the precut teeth relative to the adjoining teeth of the adjacent segments, to ensure correct tooth relation.

The provision of suitable segment end flanges permits the adoption of fitted bolts in conjunction with interposed packing pieces or shims, so that upon the achievement of tooth matching, in relation to axial alignment, pitch circle, tooth skew (if any) face parallelism and crest-to-crest spacing, an inserted segment may be secured in permanent load transfer relation with adjacent segments.

The present invention provides a segmented gear wheel having a plurality of toothed segments secured in mutual complementary relation to provide a substantially continuous toothed gear annulus, each segment including segment rim means supporting the gear teeth and bounded by segment end flanges; spacer means fixedly located between adjacent ones of the end flanges to position adjacent portions of the teeth in complementary operative relation; and securing means substantially rigidly securing adjacent flanges in torsional load transmitting relation relative to the gear main axis to maintain the gear teeth in their complementary operative relation.

The use of a segmented gear wheel as set forth makes possible the adoption of standardized "undersized" segments, wherein the securing of the load transfer structure between adjacent segments is effected independently of the matching of the teeth. Thus the positioning of the gear teeth in true complementary relation may be effected, by correct positioning of a replacement segment, and the necessary torque transmission and securing provision then effected by inserting suitable shims or other adjustable spacers between the spaced apart segment end flanges, and re-fitting fitted bolts to secure the new segment in its operating position.

While the use of fitted bolts is taught, it will be understood that other suitable techniques may be adopted in securing together the segments of a gear to achieve the requisite accuracy of the gear.

Certain embodiments of the present invention are described with reference to the accompanying figures, wherein:

FIG. 1 is an exploded general view showing portions of a subject gear in partial assembled relation;

FIG. 2 shows an axle mounting suitable for assembly with a subject annular gear;

FIG. 3 is an end view of a gear segment end flange; and

FIG. 4 is an enlarged side view of a portion of a pair of joined segments.

Referring first to FIG. 1, the assembly 10 comprises a portion 11 of the drum of an autogenous mill having a flange 12 to which the segmented gear 14 is secured by bolting to the drum flange 12.

In the case of shaft drives as shown in FIG. 2, a shaft 20 carries a disc 22 having a split rim portion 24 to receive the flange portions 28 of gear segments 16 therein.

The gear segments 16 each comprise a radially extending flange portion 28 having a rim 30 connected thereto into which the teeth 32 are cut. Each segment 16 is provided with a pair of end flanges 34 having bolts 36 to receive fitted bolts 38 therein. Packing pieces or spacer means 42, 44 interposed between adjacent end flanges 34 are fitted to bring the adjoining faces 38, 40 into a complementary facing relation so that the correct tooth pitch is maintained between adjoining segments.

Upon assembly, in addition to positioning adjacent segments 16 to bring the gear teeth to a common pitch circle and at correct pitch, the segments are also checked for tooth parallelism, the spacers or packing pieces 42, 44 are fitted to provide rigidity to the respective joints, and the holes or bores 36 are then drilled if necessary and reamed to receive the fitted bolts 38. The bolts 38 are then installed, after which the securing of the gear to its mounting may be completed.

What I claim as new and desire to secure by Letters Patent of the United States is:

1. A segmented gear wheel having a plurality of toothed segments secured in mutual complementary relation to provide a substantially continuous toothed gear annulus, each segment including segment rim means supporting the gear teeth and bounded by segment end flanges, spacer means fixedly located between selected adjacent ones of said end flanges to position adjacent teeth in complementary operative relation; and securing means substantially rigidly securing said spacer means in compressed relation between respective said adjacent end flanges in torsional load transmitting relation relative to the gear main axis to maintain said gear teeth in said complementary relation.

* * * * *